United States Patent [19]

Murakami et al.

[11] Patent Number: 5,197,050

[45] Date of Patent: Mar. 23, 1993

[54] FLYING HEAD FOR A MAGNETO-OPTICAL RECORDING DRIVE

[75] Inventors: Akemi Murakami; Shoji Yamaguchi; Kaoru Yasukawa; Takashi Nomiyama; Daisuke Iguchi, all of Ebina, Japan

[73] Assignee: Fuji Xerox Co., Ltd., Tokyo, Japan

[21] Appl. No.: 594,915

[22] Filed: Oct. 9, 1990

[30] Foreign Application Priority Data

Oct. 6, 1989 [JP] Japan ................................ 1-260125

[51] Int. Cl.⁵ .............................................. G11B 13/04
[52] U.S. Cl. ...................................... 369/13; 369/44.22
[58] Field of Search ................. 369/13, 44.22; 360/59, 360/114; 365/122

[56] References Cited

U.S. PATENT DOCUMENTS

| | | | |
|---|---|---|---|
| 4,633,450 | 12/1986 | Gueugnon | 369/13 |
| 4,769,800 | 9/1988 | Moser | 369/13 |
| 4,890,178 | 12/1989 | Ichihara | 360/114 |
| 4,953,150 | 8/1990 | Sonobe | 369/13 |
| 5,022,018 | 6/1991 | Vogelgesang | 369/13 |

FOREIGN PATENT DOCUMENTS

| | | | |
|---|---|---|---|
| 0411783 | 2/1991 | European Pat. Off. | 369/13 |
| 3730969 | 3/1989 | Fed. Rep. of Germany | 369/13 |
| 0122244 | 9/1980 | Japan | 369/13 |
| 0066532 | 4/1982 | Japan | 369/13 |
| 0094906 | 6/1982 | Japan | 369/13 |
| 0056237 | 4/1983 | Japan | 369/44.22 |
| 0057638 | 4/1983 | Japan | 369/44.22 |
| 60-261052 | 12/1985 | Japan | |
| 61-71437 | 4/1986 | Japan | |
| 0137445 | 5/1989 | Japan | 369/13 |
| 0208852 | 8/1990 | Japan | 369/13 |

Primary Examiner—Eugene R. LaRoche
Assistant Examiner—Tan Nguyen
Attorney, Agent, or Firm—Finnegan, Henderson Farabow, Garrett & Dunner

[57] ABSTRACT

A flying head assembly for a magneto-optical recording drive includes a first head portion of a nonmagnetic material, and a second head portion mounted in an aperture through the first head portion. The second head portion and aperture define an annular path through the first head portion. A coil for generating a magnetic field is wrapped concentrically around the aperture, either inside or outside of the second head portion. A laser light beam is reflected into the annular path and focused onto a recording medium.

11 Claims, 11 Drawing Sheets

DIAMETER AT BOTTOM END OF LIGHT PATH OPENING PORTION

//5,197,050

FLYING HEAD FOR A MAGNETO-OPTICAL RECORDING DRIVE

BACKGROUND OF THE INVENTION

1. Field of the Invention

The present invention relates to a flying head assembly for a magneto-optical recording drive. More particularly, the invention relates to an improved flying head assembly which can form a vertical magnetic field directed towards the focusing plane of an optical recording medium efficiently.

2. Discussion of the Related Art

To describe the principle of recording by this type of magneto-optical recording drive, referring to FIG. 17, a recording layer (a) comprised of a magnetic material is irradiated with a laser spot while a magnetic field is imposed in the direction indicated by the arrows. The Kerr rotation angle at the site of irradiation is changed through reversal of the direction of the magnetic field at this site, and such changes of the Kerr rotation angle are used to effect recording and playback of information (see FIG. 18). The system is further one in which, as illustrated in FIG. 19, recording sites of the recording layer (a) are irradiated with a laser spot while the direction of magnetization is made the reverse of what it was at the time of recording, thereby returning the direction of the magnetic field at the irradiated sites to their pre-recording states and erasing information.

The flying head described in Japanese Patent Publication No. 60-261052 is known as an optical head for effecting recording, playback and erasure of information in such a magneto-optical recording drive.

As shown in FIGS. 20-22, the main elements of this flying head (b) are an air slider (b1) which is made of soft magnetic material and is floated by the air stream that accompanies rotation of an optical recording medium (c), a prism (b2) which is mounted on the air slider (b1) and by which laser light from a light source (d) such as a semiconductor laser, etc. is reflected towards the optical recording medium (c), an object lens (b4) which is mounted in a light path opening portion (b3) of the air slider (b1) and by which the laser light reflected by the prism (b2) is focused on a focusing plane of the optical recording medium (c), and a coil (b6) which is wound in a groove (b5) provided at the light path opening portion (b3) on the optical recording medium (c) side of the air slider (b1) and forms a magnetic field that is approximately normal to the focusing plane of the optical recording medium (c). The floating head (b) is provided near the optical recording medium (c) and is supported by a spring-type suspension (b7) which can be moved radially with respect to the optical recording medium (c) by a drive unit (e).

This flying head (b) offers the advantage of being very light. One can aim for shortening access times since its structure is one in which only the smallest of elements such as the prism (b2), object lens (b4) and coil (b6), etc. are carried on the air slider (b1). There is the further advantage that since the structure is one in which the air slider (b1) can be floated by tho air stream that accompanies rotation of the optical recording medium (c), it is possible to keep the distance between the optical recording medium (c) and the object lens (b4) constant. Hence it is possible to dispense with an object lens (b4) focusing device.

However, since the overall structure of the air slider (b1) in this flying head (b) is comprised of the soft magnetic material, as noted above, the magnetic field that is generated by charging the coil (b6) with electricity is liable to be formed not just in the region on the light path opening portion (b3) side but also in the region outside the air slider (b1). Therefore, it is difficult to concentrate a vertical magnetic field directed to a set focusing plane of the optical recording medium (c), as illustrated in FIG. 23.

It is therefore necessary to provide an extremely large magnetomotive force in order to form a magnetic field of 200-300 Oe that is needed for magneto-optical recording or erasure on the focusing plane of the optical recording medium (c). The measure taken in the past to meet this requirement has been to increase the number of turns of the coil (b6).

However, it has been found that increasing the number of turns of the coil (b6) also results in an increase in self-inductance. Consequently it becomes impossible to effect high-speed switching of the direction of magnetic fields during information recording. Therefore, recording and overwriting speeds become slower.

Japanese Laid-open Patent Application No. 61-71437 discloses an improvement that is designed to effect focusing of a vertical magnetic field by the provision of a soft magnetic layer on the underside of the recording film of the optical recording medium and the formation of a magnetic path between this soft magnetic layer and the coil. This improvement is still insufficient, since it is unable to weaken the intensity of the magnetic field formed in the region outside the air slider (b1).

SUMMARY OF THE INVENTION

The present invention has been devised in view of the above problem and it has an object the provision of a floating head by which a vertical magnetic field can be directed towards a focusing plane of an optical recording medium with good efficiency.

Additional objects and advantages of the invention will be set forth in part in the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the flying head assembly for a magneto-optical recording drive of the invention comprises a flying head, including a first head portion formed of a nonmagnetic material having opposite ends, a lower surface proximate the optical recording medium and an opposite upper surface, an aperture disposed proximate one end, and a generally annular second head portion formed of a soft magnetic material disposed with its outer peripheral surface abutting the inner peripheral surface of the aperture, the second head portion and the aperture defining a path through the first head portion, light source means for generating a laser light beam, a light reflecting element disposed on the upper surface of the first head portion above the aperture for reflecting the light beam into the path through the aperture, a lens disposed within the aperture for focusing the reflected light beam in the path onto the optical recording medium, and magnetic field generating means concentrically mounted with the aperture and second head portion, for forming a magnetic field directed towards a focusing plane of the optical recording medium.

BRIEF DESCRIPTION OF THE DRAWINGS

The accompanying drawings, which are incorporated in and constitute a part of this specification, illustrate embodiments of the invention, and together with the description, serve to explain the objects, advantages, and principles of the invention. In the drawings.

DESCRIPTION OF THE PREFERRED EMBODIMENTS

Figure 1:
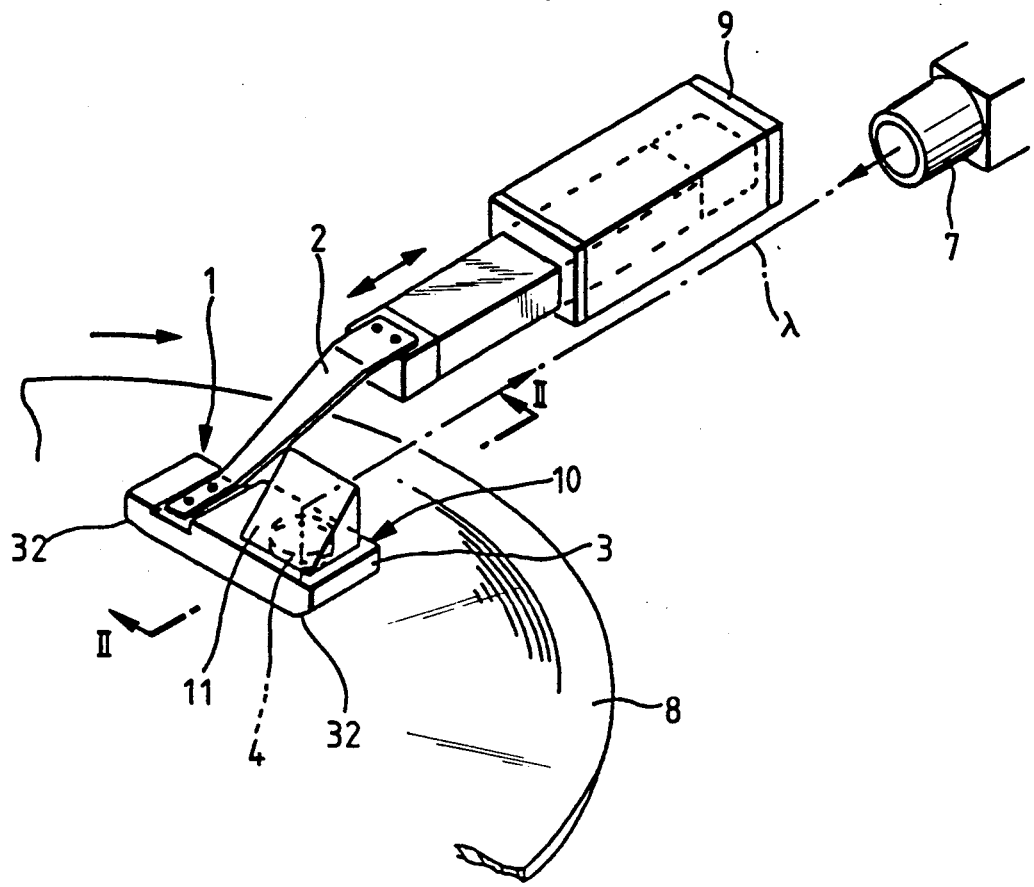
FIG. 1 is a perspective view of a flying head according to a first embodiment of the invention.

A detailed description of embodiments of the invention will now be given with reference to the drawings.

The present invention is one in which, assuming that the head is a flying head for a magnetooptic recording drive which is provided with an air slider, is located near a rotating optical recording medium, and is caused to float by the air stream that accompanies rotation of the optical recording medium, a reflecting element which is mounted on the air slider and by which focused light from a light source is reflected towards the optical recording medium, an object lens which is mounted in a light path opening portion of the air slider and by which focused light which has been reflected by the reflecting element is focused onto a focusing plane of the optical recording medium, and a magnetic field generation means which is mounted near the light path opening portion of the air slider and forms a magnetic field directed towards the focusing plane of the optical recording medium and which records or erases information by focusing focused light from the light source on the focusing plane of the optical recording medium in conditions in which a magnetic field has been formed by the magnetic field generation means, the air slider is constituted by a main inner element which is defined by a soft magnetic material wound about a coil and has a light path opening portion formed therein and a main outer element which is made of a nonmagnetic body and in which the main inner element is fitted.

The main inner element in this technical means is comprised of a soft magnetic body such as Mn-Zn ferrite, Ni-Zn ferrite or permalloy, etc. in order to make it easy to concentrate magnetic fields at the side of the light path opening portion that is formed in the main inner element. There are no particular restrictions regarding its shape but preferably the shape is made one that matches the shape of the light path opening portion, so as to permit formation of a uniform magnetic field at the side of the light path opening portion.

In order to reduce formation of a magnetic field on the main outer element side and to facilitate concentration of a magnetic field at the side of the light path opening portion, the main outer element into which the main inner element is fitted is comprised of a nonmagnetic body such as glassy carbon, barium titanate, calcium titanate or a ceramic, etc. Constituting the main outer element from a nonmagnetic material such as calcium titanate or a ceramic, etc. offers the advantage of good machinability, while comprising it of a nonmagnetic material such as glassy carbon, etc. which possesses lubrication properties offers the advantage that wear of the main outer element and the optical recording medium when the two come into contact is reduced.

There are no particular restrictions regarding the method by which the main inner element is fitted into the main outer element and one may equally employ a procedure in which the main inner element is simply fitted in a fit-in portion of the main outer element. Another possible procedure is one in which the two elements are fitted together with interposition of adhesive on their mating surfaces.

In order to bring about efficient transfer of floating lift pressure from the optical recording medium, it is necessary to form at least a glide surface and an air introduction surface on the underside of the air slider comprised of the above described main inner element and main outer element. Also, grooves that allow air to escape, i.e., a central escape portion, may be formed going in the direction of the length of the air slider in order to stabilize floating travel of the air slider. In this case, the number and shape of the grooves may be set as required in accordance with objects.

Considering next the shape of the light path opening portion provided in the main inner element, this portion is formed as a generally circular shape matching the spot shape of focused light. If the inner wall surface of the light path opening portion is formed so that it slopes inwardly in the direction of incidence of focused light, it provides the advantage that the magnetic field directed towards the focusing plane of the optical recording medium can be more concentrated. This occurs because the magnetic field generation means provided near the light path opening portion and the convergence point of focused light on the optical recording medium can be brought closer together. In particular, the effect is very marked if the angle of the slope of the inner wall surface of the light path opening portion is made approximately the same as the focusing angle of the focused light, since in this case maximum proximity of the magnetic field generation means and the above noted convergence point is achieved.

Further, transparent material in the form of material that is transparent to light such as polymethylmethacrylate (PMMA) or a similar resin or glass such as Corning 7059, etc. may be packed into at least the optical recording medium end of the light path opening portion. Introduction of such packing material offers the advantage that floating travel is stable since the bottom surface side of the light path opening portion is plugged. It also offers an advantage as described below. The flying head optical system used in a magneto-optical recording drive is generally that of a phase-change type recording device. However, since the recording and erasure method normally employed in a phase-change type recording device is to direct focused light from the transparent substrate side of an optical recording medium and focus it on the medium's recording film surface, an object lens whose focal distance takes the refractive index of the transparent substrate into account is used in the device. In contrast, in the case of a magneto-optical recording drive, it is not possible to use a method of irradiation with focused light from the substrate side since it is necessary to form a strong magnetic field on the recording film surface of the optical recording medium. Therefore, a method of direct focusing of focused light onto the recording film surface is employed. But since this procedure is employed, when the object lens is used directly, as it is in the floating head of the magneto-optical drive, the focused light fails to be properly focused on the recording film surface. In such cases, it is possible to bring about proper focusing of focused light on the recording film surface of the optical recording medium by packing into the light path opening portion transparent packing material constituted by light-transmitting material whose refractive index is approximately the same as that of the transparent substrate.

To consider next the mounting position for the coil or other such magnetic field generation means, this may be anywhere as long as it is near the light path opening portion of the main inner element. The magnetic field generation means may either be mounted on the side of the main inner element that is adjacent the main outer element, or be mounted on the inner wall surface of the light path opening portion of the main inner element. The mounting position is preferable from the point of view of achieving more efficient concentration of magnetic fields directed towards the focusing plane of the optical recording medium. If the magnetic field generation means is mounted on the inner wall surface of the light path opening portion, all that is needed to prevent it dropping down out of the light path opening portion is to provide a suitable stopper at the bottom end of the light path opening portion.

Alternatively, it is possible to mount one magnetic field generation means on the inner wall surface of the light path opening portion of the main inner element and one on the outer peripheral surface of the side of the main inner element. Mutual interference occurs between the magnetic field produced by the magnetic field generation means mounted on the inner wall surface of the light path opening portion of the main inner element and the magnetic field produced by the magnetic field generation means mounted on the outer peripheral surface of the side adjacent the main outer element. It is thus possible to produce a magnetic field of uniform intensity over the focusing plane of the optical recording medium and in the surrounding region. There is therefore the advantage that even if slight slippage of the focused light convergence point occurs due to surface flutter, etc. of the optical recording medium, this does not cause any hindrance to information recording and erasure operations.

For the reflecting element which reflects focused light from the light source towards the optical recording medium, one may use a prism or reflecting mirror, etc. as is done conventionally.

Since the air slider in the above described technical means is constituted by a main inner element which is defined by a soft magnetic body and is provided with a light path opening portion, and a main outer element which is defined by a nonmagnetic body and in which the main inner element is fitted, the means makes it possible to reduce formation of a magnetic field on the nonmagnetic main outer element side. This makes possible a correspondingly greater concentration of the magnetic field that is directed towards the focusing plane of the optical recording medium.

Figure 2:
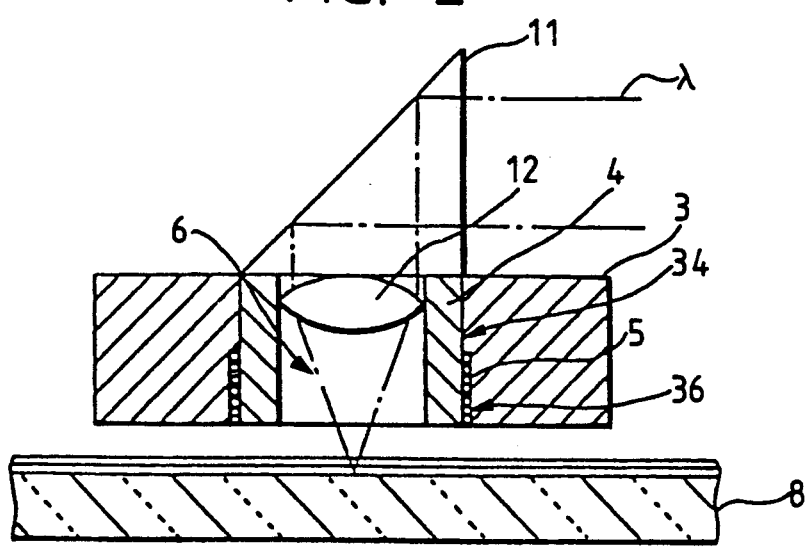
FIG. 2 is a cross-sectional view of the flying head of FIG. 1 through II—II.
Figure 3:
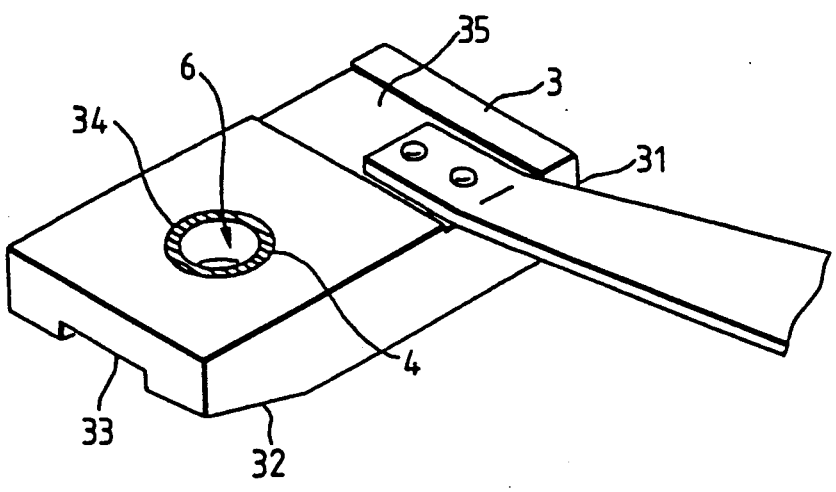
FIG. 3 is a partial perspective view in which a portion of the structure of this flying head is omitted.

In a first preferred embodiment, referring to FIGS. 1-3, the main elements of the floating head according to this embodiment are a main outer element 3 that is supported by a spring-type suspension 2 and a ring-shaped main inner element 4 that is fitted into the main outer element 3.

The main outer element 3 is made of glassy carbon. As shown in FIG. 3, at its bottom surface end, taper portions 31 and 32 for making the arrival and departure of air streams smooth are provided on the air stream arrival side and the air stream departure side. In the center of its bottom surface there is a central escape portion 33 for stabilizing the flying travel of the flying head 1. In the central portion of the air stream departure side of the main outer element 3, there is a mounting opening 34 as shown in FIG. 3 to permit the main inner element 4 to be installed. A mounting recess 35 for attachment of the spring-type suspension 2 is formed in the upper surface of the main outer element 3 in a position that is near to the center of gravity of the flying head 1. As shown in FIG. 2, in the lower portion of the inner peripheral surface of the mounting opening 34, there is a mounting groove 36 for assembly of a coil 5.

As embodied in FIG. 2, coil 5 comprises a magnetic field generation means.

As illustrated in FIGS. 2-3, the main inner element 4 is defined by a ring-shaped Mn-Zn ferrite element. It is installed and fitted via adhesive etc. in the mounting hole 34 of the main outer element 3. The inner periphery of its ring shape defines a light path opening portion 6. The coil 5 is wound around that portion of the outer peripheral surface of the main inner element 4 which corresponds to the mounting groove 36 of the main outer element 3.

A prism 11 which is made of glass material such as BK7, etc. and serves to reflect laser light from a semiconductor laser 7 towards a magnetooptical disk 8 is mounted on the upper surface of the main inner element 4. The main outer element 3 is fitted and an object lens 12 is mounted and fitted in the end of the light path opening portion 6 of the main inner element 4 that is next to this prism 11.

The spring type suspension 2 has a drive unit 9 attached to its base end, while its front end is fitted in the mounting groove 35 of the main outer element 3. The suspension 2 thereby holds the floating head 1 disposed in a set position. The drive unit 9 is comprised of an element such as a voice coil motor, etc. It moves the spring type suspension 2 radially with respect to the magnetooptical disk 8 in response to control signals such as tracking error signals, etc. input to the drive unit 9. It thereby controls displacement of the flying head 1 attached to spring type suspension 2 over set tracks of the magnetooptical disk 8.

With the flying head 1 described above, as the magnetooptical disk 8 rotates, the air slider 10, comprised of the main outer element 3 and main inner element 4, floats up about 2 or 3 μm. As shown in FIG. 2, laser light λ radiated parallel with the direction of displacement of the drive unit 9 strikes a surface of the prism 11 of the flying head 1 and goes via the object lens 12 to be focused on the focusing plane of the magnetooptical disk 8. At the same time the coil 5 wound around the outer peripheral surface of the main inner element 4 below the object lens 12 is energized, resulting in imposition of a perpendicular magnetic field (i.e., a magnetic field parallel to the optical axis of the laser light) of 200-300 Oe directed towards the focusing plane of the magnetooptical disk 8 from the coil 5 and hence in execution of a recording operation. Alternatively, a playback operation can be performed by laser light λ reflected from the surface of the magnetooptical disk 8 going via the same light path to enter a photodiode (not shown).

Figure 4A:
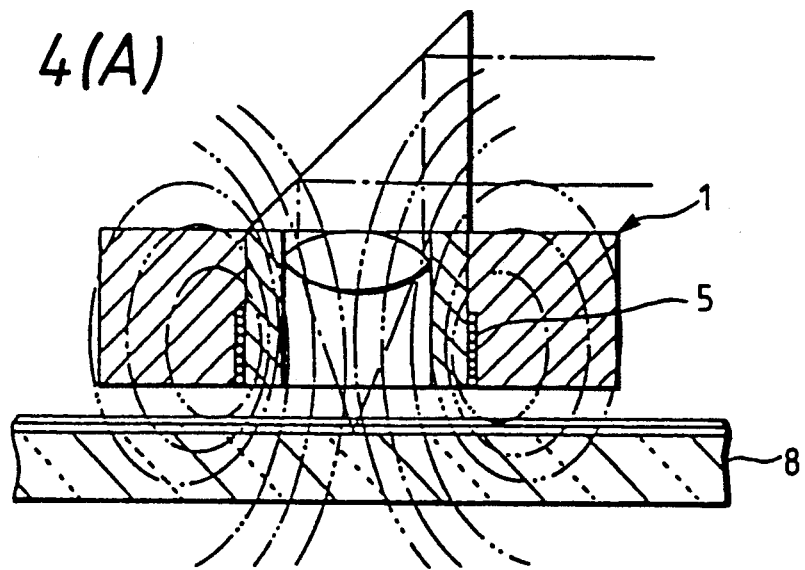
FIG. 4(A) is an explanatory drawing of the operation of this flying head.

Since the air slider 10 in the flying head 1 of this embodiment is comprised of a main inner element 4 which is made of Mn-Zn ferrite, having a light path opening portion 6, and by a main outer element 3 which is made of glassy carbon and has the main inner element 4 fitted in it, it is possible to reduce formation of a magnetic field on the nonmagnetic main outer element 3 side. Hence it is possible to achieve a corresponding increase in the concentration of the magnetic field that is directed towards the focusing plane of the magnetooptical disk 8. This result is illustrated in FIG. 4(A).

Therefore, it is possible to form the magnetic field of 200-300 Oe needed for magnetooptic recording or erasure in the focusing plane of the magnetooptic disc 8 without supplying a large magnetomotive force such as used in the past. Consequently it is possible to reduce the number of turns of the coil 5 carried by the flying head 1, and to reduce the current supplied to the coil 5.

For this reason, there is a decrease in the inductance of the coil 5 carried by the flying head 1. This offers the advantage that the directions of the magnetic fields can be reversed at high speed during information recording and erasure, thereby increasing the speed of recording and rewriting.

Figure 4B:
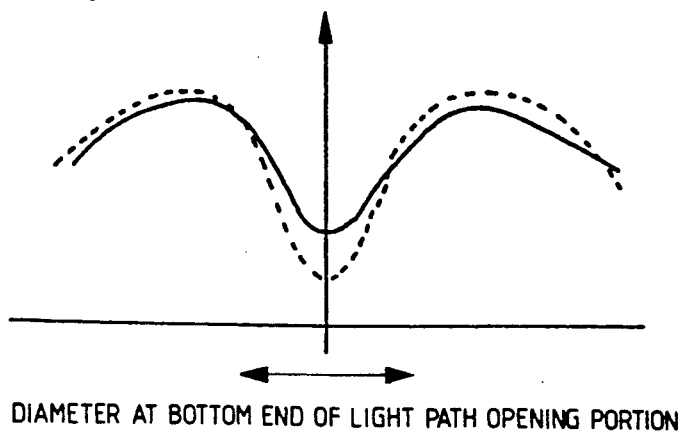
FIG. 4(B) is a plot of the relative field intensity of magnetic fields formed in the vicinity of the focusing plane of a magnetooptical disk.

The solid line in FIG. 4(B) shows the relative field intensity distribution of magnetic fields formed near the focusing plane of a magnetooptical disk by the coil carried by the flying head of this embodiment. The dashed line in FIG. 4(B) shows the relative field intensity distribution of magnetic fields formed near the focusing plane of a magnetooptical disk by the coil carried by a conventional floating head. It can be seen that with the floating head of this embodiment, concentration of the magnetic field on the focusing plane is accompanied by a rise in the field intensity in the focusing plane. The arrowed line beneath the axis of FIG. 4(B) indicates the dimension of the diameter at the bottom end of the light path opening portion (likewise in the figures below).

Figure 5:
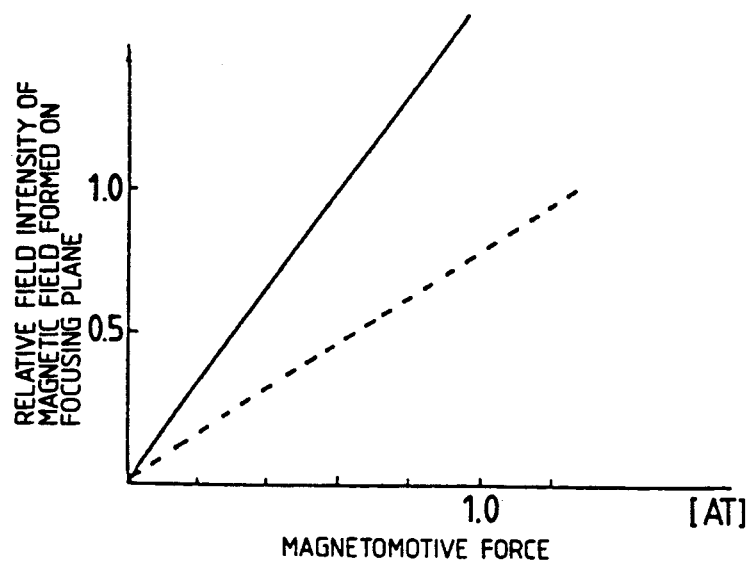
FIG. 5 is a graph showing relations between the magnetomotive force of coils carried by flying heads and the relative field intensity of magnetic fields formed on the focusing plane of a magnetooptical disk.

FIG. 5 is a graph which shows the relation between the magnetomotive force of coils carried by flying heads and the relative field intensity of magnetic fields formed on the focusing planes of magnetooptical disks. The solid line in the figure indicates values for the flying head of this embodiment. The dashed line indicates values for a conventional floating head. It can be seen that with the flying head of the embodiment, the magnetomotive force needed for producing a requisite field intensity is only about half that needed in the case of a conventional flying head. It is therefore possible to effect high-speed reversal of the directions of magnetic fields while maintaining a field intensity of 200-300 Oe.

Figure 6:
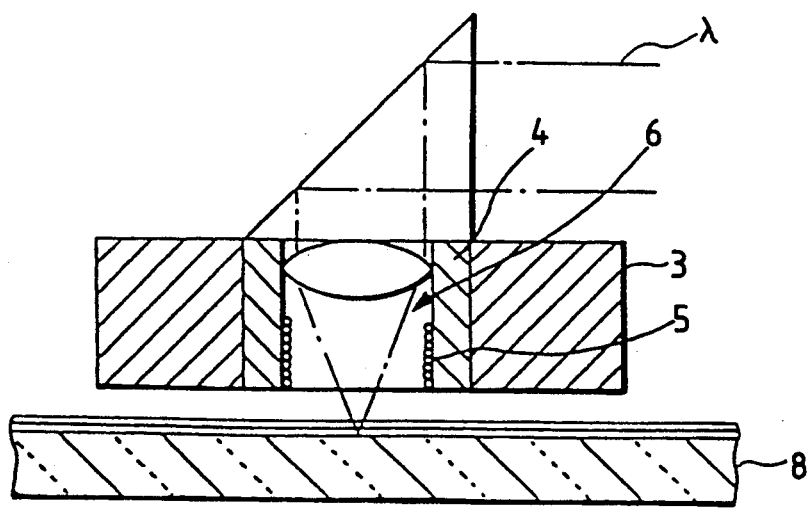
FIG. 6 is a cross-sectional view of a flying head according to a second embodiment of the invention.

The floating head according to a second preferred embodiment is generally the same as that of the first embodiment except that, as broadly embodied in FIG. 6, the coil 5 which herein comprises a magnetic field generation means is assembled on a lower portion of the inner peripheral surface of the light path opening portion 6 of the main inner element 4. At the bottom end of the light path opening portion 6, there is a ring-shaped stopper (not shown) that goes along the edge of this bottom end and serves to stop the coil 5 falling down or the coil 5 may be fixed by adhesive.

Figure 7A:
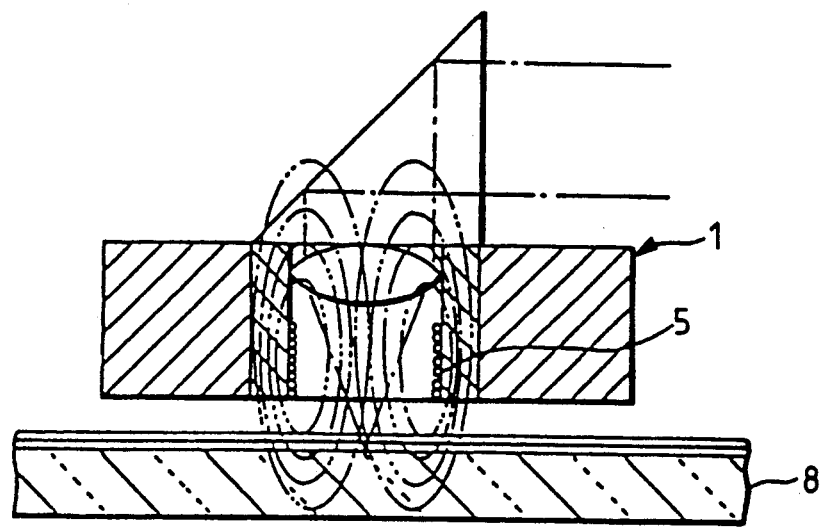
FIG. 7(A) is an explanatory drawing of the operation of the flying head of FIG. 6.
Figure 7B:
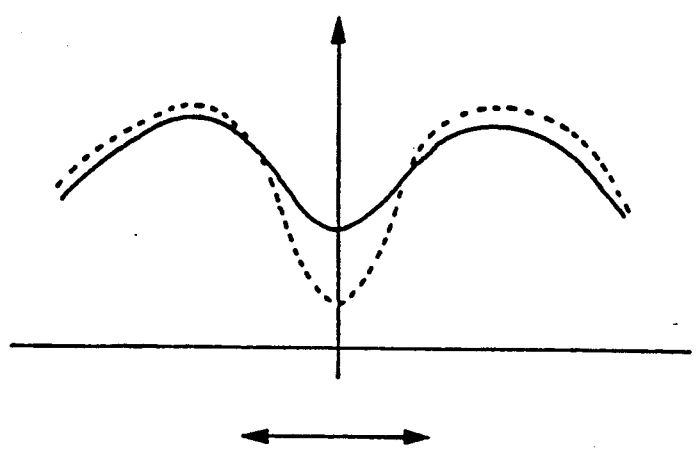
FIG. 7(B) is a plot of the relative field intensity of magnetic fields formed in the vicinity of the focusing plane of a magnetooptical disk.

The flying head of the second embodiment offers the same advantages as the first embodiment, since it reduces formation of a magnetic field on the nonmagnetic main outer element 3 side. Since the coil 5 is provided within the light path opening portion 6 and is even closer to the optical axis of the laser light (λ), it also offers the further advantages of greater concentration of the magnetic field that is directed towards the focusing plane of the magnetooptical disk 8, as illustrated in FIG. 7(A), and of an increase in the field intensity on the focusing plane, as shown by the solid line of FIG. 7(B).

Figure 8A:
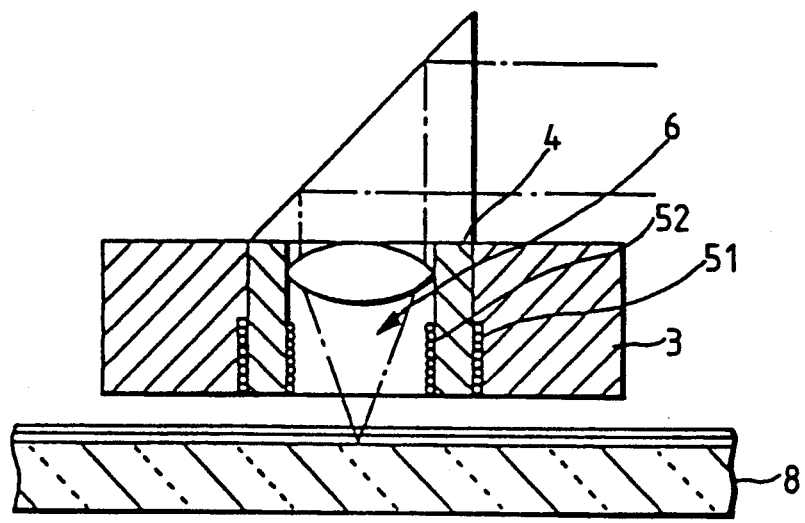
FIG. 8(A) is a cross-sectional view of a flying head according to a third embodiment of the invention.
Figure 8B:
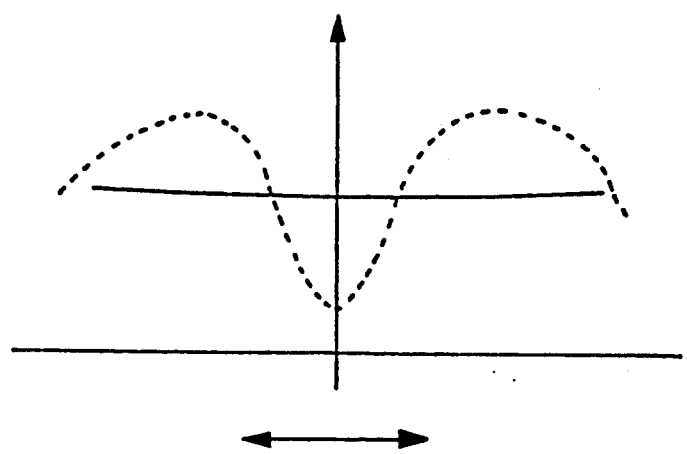
FIG. 8(B) is a plot of the relative field intensity of magnetic fields formed in the vicinity of the focusing plane of a magnetooptical disk.

The flying head according to a third preferred embodiment is generally the same as that of the first and second embodiments except that, as broadly embodied in FIG. 8 (A), coils 51 and 52, which herein comprise magnetic field generation means, are assembled on both the outer peripheral surface and the inner peripheral surface of the main inner element 4. As in the second embodiment, a ring-shaped stopper (not shown) is installed at the bottom end of the light path opening portion 6 or is fixed by adhesive.

The flying head of the third embodiment offers the same advantages as the first embodiment, since it reduces formation of a magnetic field on the nonmagnetic main outer element 3 side. Further, since the coils 51 and 52 are assembled on both the outer peripheral surface and the inner peripheral surface of the main inner element 4, mutual interference occurs between the magnetic field produced by the coil 51 mounted on the outer peripheral surface and the magnetic field produced by the coil 52 mounted on the inner peripheral surface. As a result it is possible to form a magnetic field of uniform intensity on the focusing plane of the magnetooptical disk 8 and in the region around this plane, as indicated by the solid line in FIG. 8(B). The third embodiment therefore offers the added advantage that no hindrance to information recording or erasure is caused even if slight slippage of the convergence point of laser light occurs due to surface flutter of the magnetooptical disk 8, etc.

Figure 9:
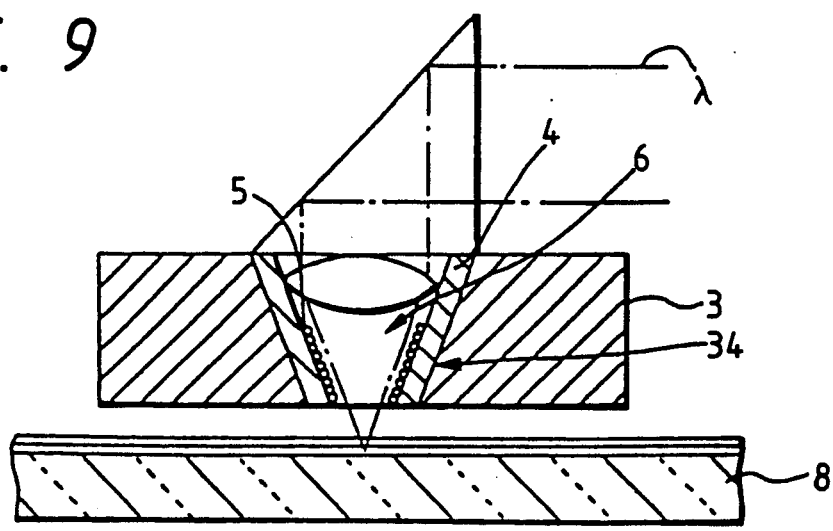
FIG. 9 is a cross-sectional view of a flying head according to a fourth embodiment of the invention.

The flying head of a fourth preferred embodiment is generally the same as that of the second embodiment except that, as broadly embodied in FIG. 9, the inner wall surface of the light path opening portion 6 of the main inner element 4 defines a slope which goes inwards in the direction of incidence of laser light λ. The slope is generally the same as the focusing angle of the laser light, and that as well as this slope being defined the mounting opening 34 of the main outer element 3 defines a slope too.

Figure 10:
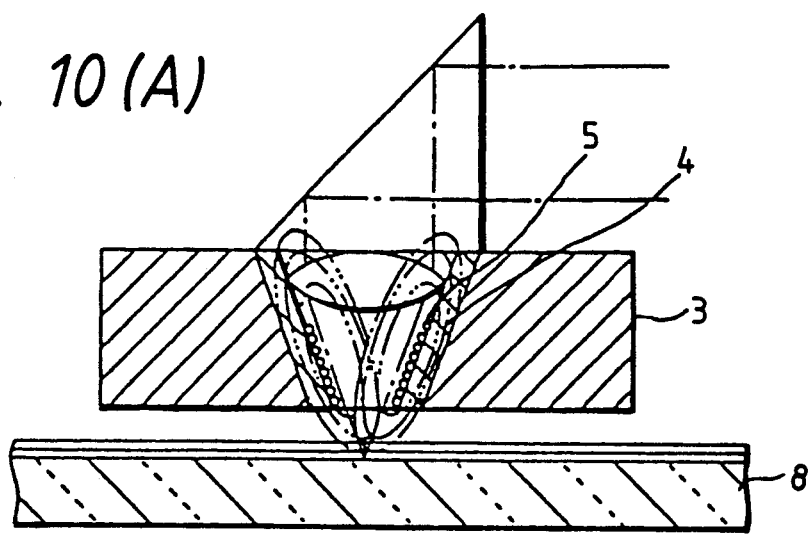
FIG. 10(A) is an explanatory drawing of the operation of the flying head of FIG. 9.
FIG. 10(B) is a plot of the relative field intensity of magnetic fields formed in the vicinity of the focusing plane of a magnetooptical disk.
Figure 10:
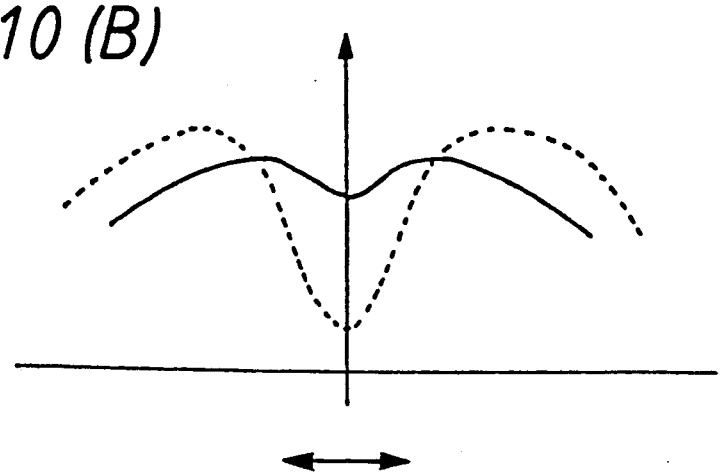

The flying head of the fourth embodiment offers the same advantages as the first embodiment, since it reduces formation of a magnetic field on the nonmagnetic main outer element 3 side. Further, since the coil 5 is brought into maximum proximity to the optical axis of the laser light λ by being mounted on the sloping surface of the light path opening portion 6, the fourth embodiment makes it possible to further concentrate magnetic fields directed towards the focusing plane of the magnetooptical disk 8, as illustrated in FIG. 10(A). Therefore, this embodiment offers the added advantage of greater field intensity on the focusing plane, as indicated by the solid line of FIG. 10(B).

Figure 11:
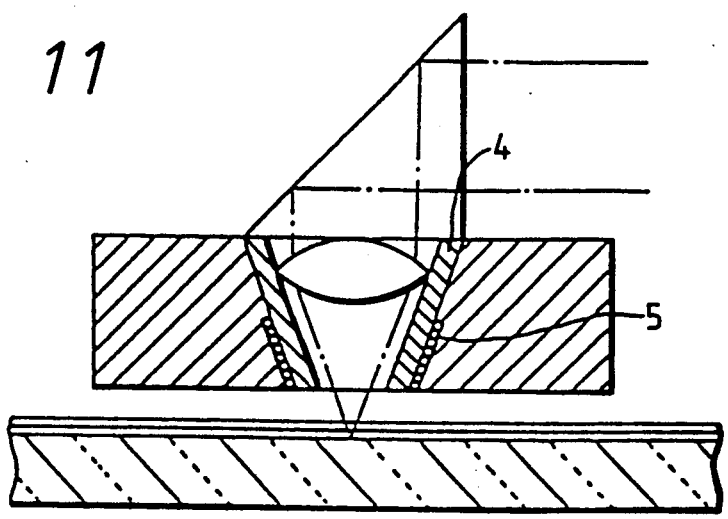
FIG. 11 is a cross-sectional view of a flying head that is a modification of the fourth embodiment shown in FIG. 9
Figure 12:
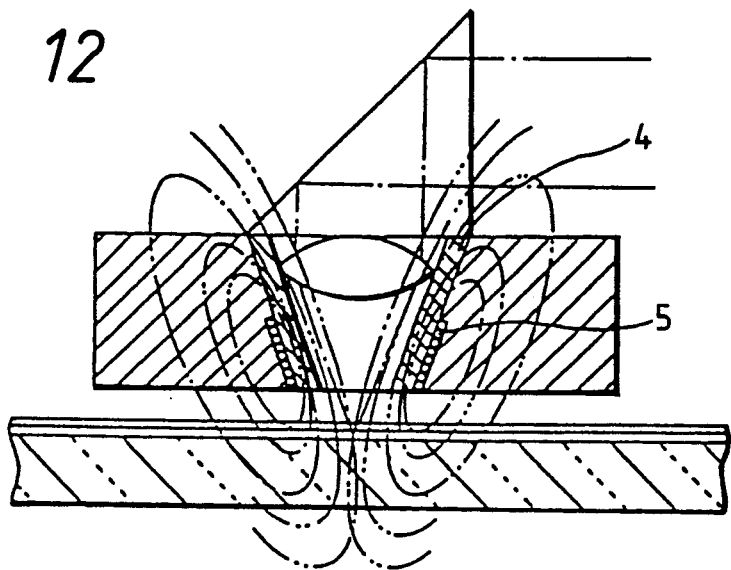
FIG. 12 is an explanatory drawing of the operation of the flying head shown in FIG. 11.
Figure 13:
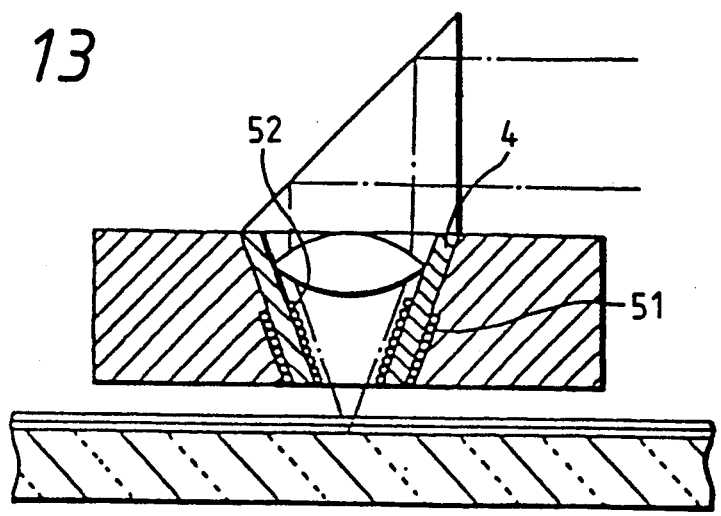
FIG. 13 is another cross-sectional view of a flying head that is a modification of the fourth embodiment shown in FIG. 9.

Instead of this structure, it is further possible to assemble the coil 5 on the outer peripheral surface of the main inner element 4 provided with a slope as shown in FIG. 11 in order to increase the field intensity on the focusing plane as shown in FIG. 12. Alternatively, the same effects as in the third embodiment can be produced by assembling coils 51 and 52 on both the outer peripheral surface and the inner peripheral surface of the main inner element 4 as shown in FIG. 13.

Figure 14:
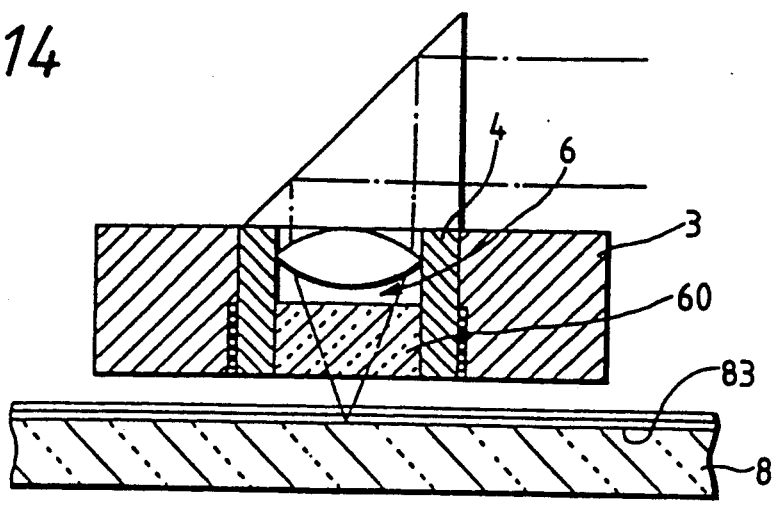
FIG. 14 is a cross-sectional view of a flying head according to a fifth embodiment of the invention.

The flying head of a fifth preferred embodiment is generally the same as that of the first embodiment except that, as shown in FIG. 14, the lower end portion of the light path opening portion 6 of the main inner element 4 is packed with transparent packing material 60 made of PMMA.

Figure 16:
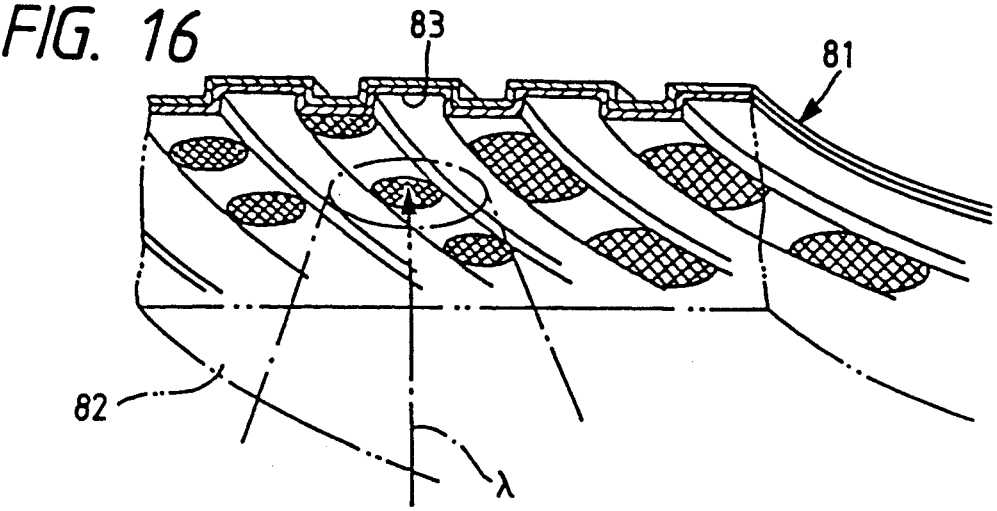
FIG. 16 is a schematic perspective view of the bottom surface of an optical disk that is employed in a phase-change type recording device.
Figure 17:
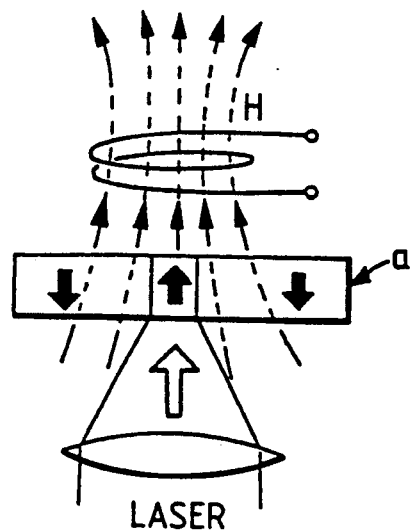
FIGS. 17-19 are explanatory drawings of the principle of recording in a magneto-optical recording drive.
Figure 18:
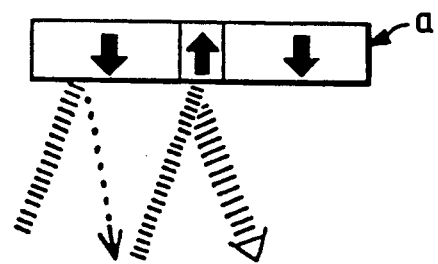
Figure 19:
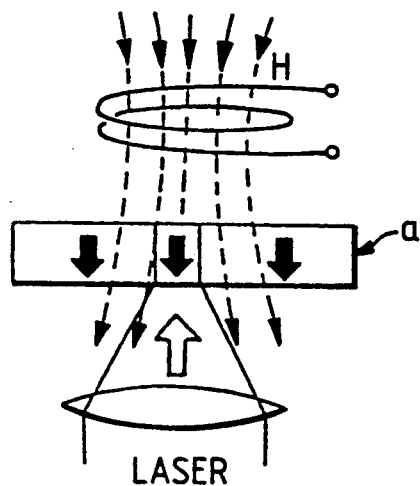
Figure 20:
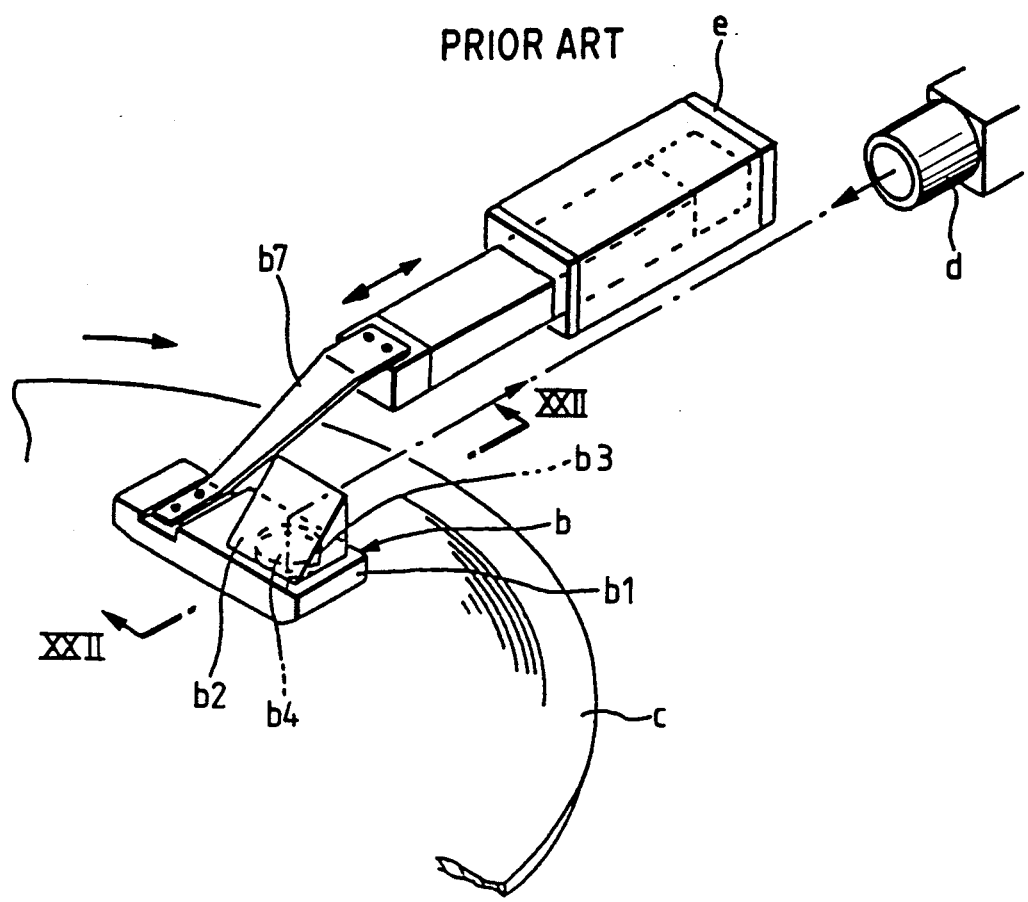
FIG. 20 is a perspective view of a flying head in a conventional magneto-optical recording drive.
Figure 21:
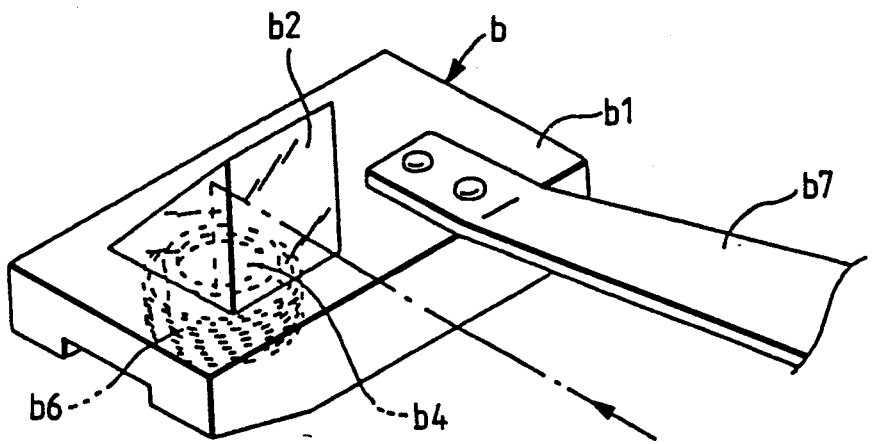
FIG. 21 is a partial, enlarged perspective view of the conventional recording drive of FIG. 20.
Figure 22:
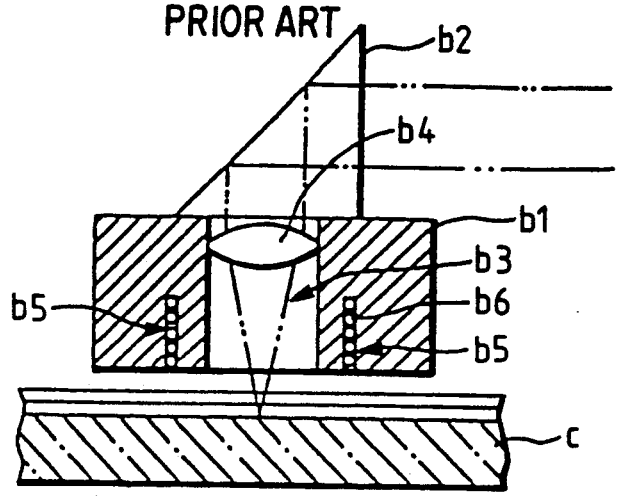
FIG. 22 is a cross-sectional view through XXII—XXII of FIG. 20.
Figure 23:
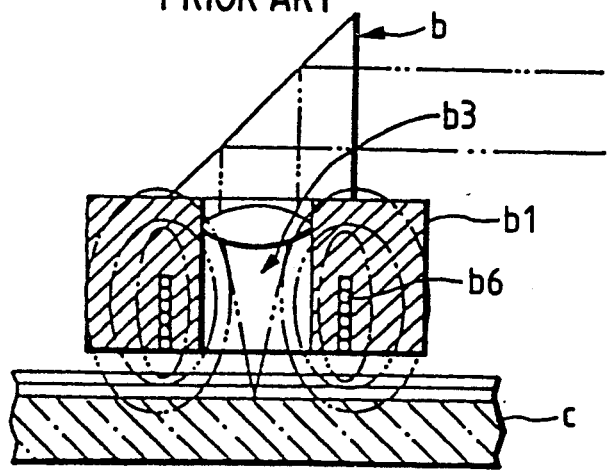
FIG. 23 is an explanatory drawing of the operation of the conventional flying head.

The flying head of this embodiment offers the same advantages as the first embodiment, since it reduces formation of a magnetic field on the nonmagnetic main outer element 3 side. Further, since the magnetooptical disk 8 end of the light path opening portion 6 is plugged with transparent packing material 60, the fifth embodiment also stabilizes floating travel of the flying head 1 and further offers the following advantage. The flying head optical system used in this type of magneto-optical recording drive is generally that of a phase-change type recording device. As shown in FIG. 16, the recording and erasure method normally employed in a phase-change type recording device is to effect irradiation with laser light λ from the transparent substrate 82 side of an optical disk 81, and focus the laser light λ on the disk's recording film 83. Therefore, an object lens whose focal distance takes the refractive index of the transparent substrate 83 into account is used in the device. If the object lens is used directly, as it is, in the flying head of a magneto-optical recording drive, the laser light fails to be properly focused on the recording film surface.

However, packing the interior of the light path opening portion 6 with transparent packing material 60, having a refractive index which is the same as that of the transparent substrate 82 offers the advantage that the above problem is eliminated. The laser light λ is focused on the surface of the recording film 83 via this transparent packing material 60.

Figure 15:
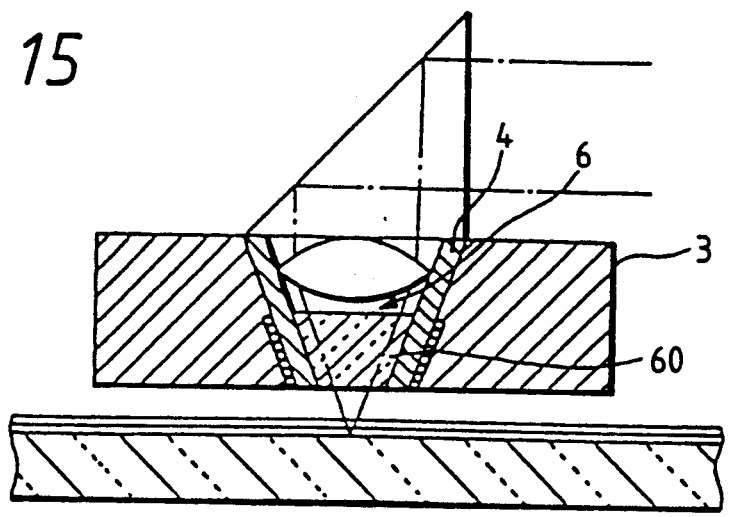
FIG. 15 is a cross-sectional view of a modification of the flying head of FIG. 14.

It is also possible to employ a structure in which transparent packing material 60 is packed into the light path opening portion 6 of a main inner element 4 that defines a slope as shown in FIG. 15.

Since, according to the invention, an air slider is comprised of a main inner element which is defined by a soft magnetic body and is provided with a light path opening portion, and a main outer element which is defined by a nonmagnetic body and in which the main inner element is fitted, the invention makes it possible to reduce formation of a magnetic field on the nonmagnetic main outer element side and makes possible correspondingly greater concentration of the magnetic field directed towards the focusing plane of an optical recording medium.

Therefore, magnetic fields of the intensity needed for magnetooptic recording or erasure on the focusing plane of an optical recording medium can be produced even without supply of a large magnetomotive force, such as that used in the past. Consequently it is possible to reduce the number of turns of a coil, etc. carried by the floating head, and to reduce the current supplied to the coil, thereby giving the advantage of faster recording and rewriting speeds.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A flying head assembly for a magneto-optical recording drive which floats on an air stream above a rotating optical recording medium, the assembly comprising:

a flying head, including a first head portion formed of a nonmagnetic material having opposite ends, a lower surface proximate the optical recording medium and an opposite upper surface, an aperture disposed proximate one end and having an inlet at the upper surface and an outlet at the lower surface, and a second head portion formed of a magnetic material disposed with its outer peripheral surface abutting the inner peripheral surface of said aperture, said second head portion and said aperture defining a generally annular path through said first head portion;

light source means for generating a laser light beam;

a light reflecting element disposed on said upper surface of said first head portion above said aperture for reflecting said light beam into the annular path through said aperture;

a lens disposed within said aperture for focusing said reflected light beam onto the optical recording medium; and magnetic field generating means concentrically mounted with said aperture and second head portion spaced from the inlet and proximate to the outlet of said aperture, for forming a magnetic field directed towards a focusing plane of the optical recording medium.

2. An assembly according to claim 1, wherein said magnetic field generating means includes a coil disposed concentrically around the outer peripheral surface of said second head portion.

3. An assembly according to claim 1, wherein said magnetic field generation means includes a coil disposed concentrically around the inner peripheral surface of said second head portion.

4. An assembly according to claim 1, wherein said magnetic field generating means includes a first coil disposed concentrically around the outer peripheral surface of said second head portion, and a second coil disposed concentrically around the inner peripheral surface of said second head portion.

5. An assembly according to claim 1, wherein said annular path has a first diameter at the upper surface of said first head portion, and a second diameter smaller than the first diameter at the lower surface of said first head portion, said aperture and second head portion generally defining a funnel between said upper surface and said lower surface.

6. An assembly according to claim 5, wherein said second head portion has an inner peripheral surface with a predetermined slope, the focused light beam has a focusing angle, and said slope of said inner peripheral surface is approximately equal to said focusing angle.

7. An assembly according to claim 5, wherein said magnetic field generating means includes a coil disposed concentrically around the outer peripheral surface of said second head portion.

8. An assembly according to claim 5, wherein said magnetic field generation means includes a coil disposed concentrically around the inner peripheral surface of said second head portion.

9. An assembly according to claim 5, wherein said magnetic field generating means includes a first coil disposed concentrically around the outer peripheral surface of said second head portion, and a second coil disposed concentrically around the inner peripheral surface of said second head portion.

10. An assembly according to claim 1, further including a transparent packing material disposed within said aperture in the path between said opposite surfaces.

11. An assembly according to claim 10, wherein said packing material has a refractive index equal to a refractive index of the substrate material of the optical recording medium.

* * * * *

UNITED STATES PATENT AND TRADEMARK OFFICE
CERTIFICATE OF CORRECTION

PATENT NO. : 5,197,050
DATED : March 23, 1993
INVENTOR(S) : Akemi Murakami et al.

It is certified that error appears in the above-indentified patent and that said Letters Patent is hereby corrected as shown below:

Claim 8, column 12, line 18, change "generation" to --generating--.

Signed and Sealed this

First Day of March, 1994

Attest:

BRUCE LEHMAN

Attesting Officer

Commissioner of Patents and Trademarks